UNITED STATES PATENT OFFICE.

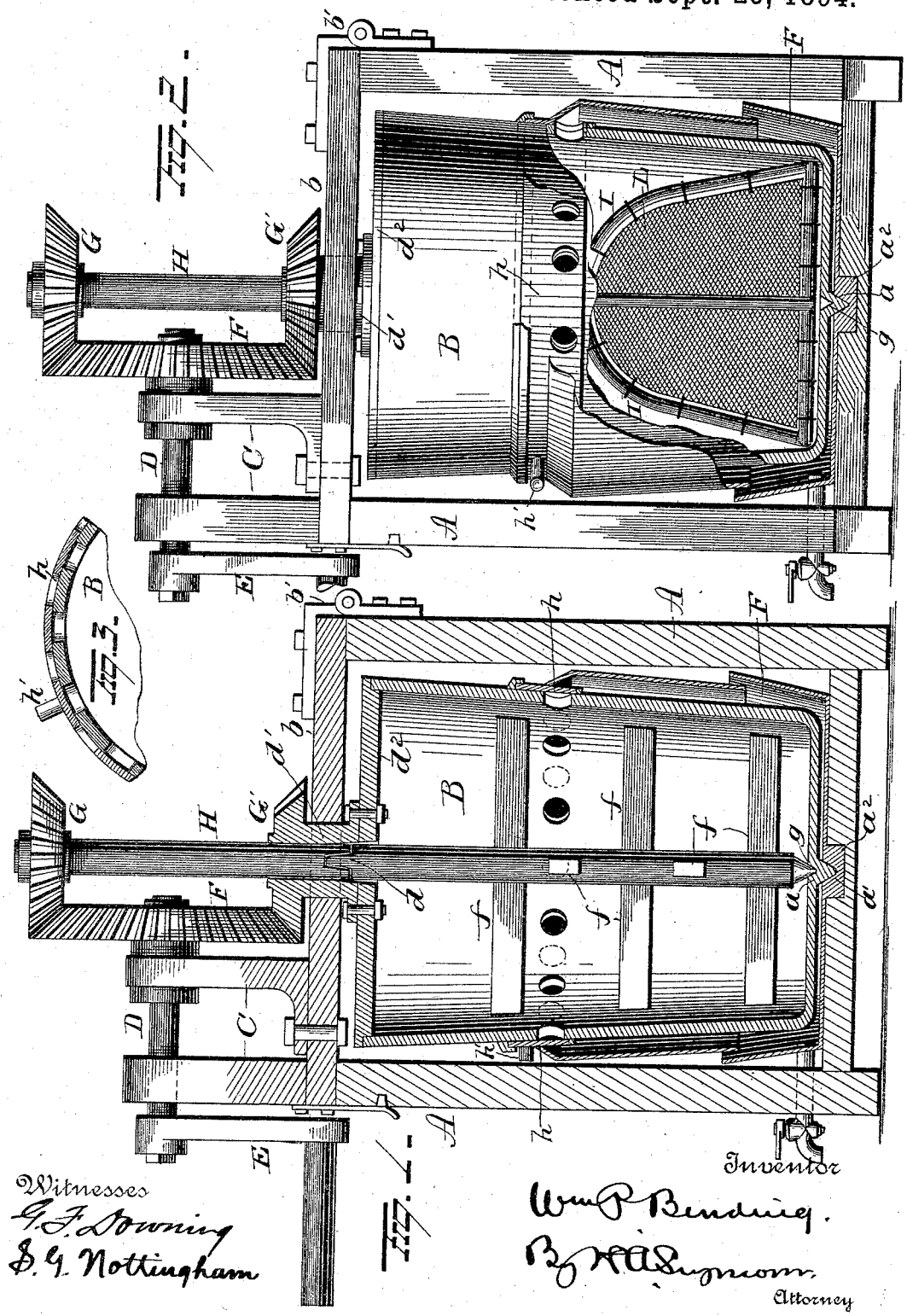

WILLIAM P. BENDING, OF CHAMBERSBURG, PENNSYLVANIA, ASSIGNOR OF ONE-HALF TO AUG. WOLF & CO., OF SAME PLACE.

CHURN.

SPECIFICATION forming part of Letters Patent No. 526,607, dated September 25, 1894.

Application filed December 3, 1892. Renewed May 14, 1894. Serial No. 511,267. (No model.)

*To all whom it may concern:*

Be it known that I, WILLIAM P. BENDING, of Chambersburg, in the county of Franklin and State of Pennsylvania, have invented certain new and useful Improvements in Churns; and I do hereby declare the following to be a full, clear, and exact description of the invention, such as will enable others skilled in the art to which it appertains to make and use the same.

My invention relates to an improvement in churns, and it consists in the parts and combinations of parts as will be hereinafter more fully described and pointed out in the claims.

In the accompanying drawings, Figure 1 is a vertical section of my improvement. Fig. 2 is a similar view with the dashers removed, showing the muslin bag in position, and Fig. 3 is a detailed view showing the valves and mechanism for closing same.

A represents the frame of the churn and B the churn proper, which latter is located within the frame A, and is provided centrally on its bottom with a projection $a$ preferably V-shaped in form which rests in a recess $a'$ located in the block $a^2$ set on the bottom of the frame A. This projection $a$ acts as a pivot for churn B when the latter is rotated. The frame A is provided with a cover $b$, which latter is hinged or otherwise secured to said frame as shown at $b'$. Located on the cover and at a point directly opposite the hinged connection $b'$ are standards or uprights C, C, which latter support the shaft D. The handle E is secured to the outer end of shaft D while the opposite end carries the upright bevel gear wheel F, which meshes with the bevel gear wheel G carried by the outer end of shaft H, and with bevel gear wheel G', which latter is secured to a hollow sleeve $d'$ said sleeve being secured to the top or cover $d^2$ of churn B.

The shaft H is constructed in two parts and jointed together as shown at $d$, the upper section of which carries the bevel gear wheel G, while the lower section carries the dashers $f$. The lower end of shaft H fits into a conical shaped recess $g$, which is located in the bottom of churn B and when the latter is in operation the shaft H revolves in the recess $g$.

The churn B is provided at a suitable point with a perforated rim $h$ for the escape of butter milk during churning and $h'$ is a handle by means of which the perforations or valves $h$ are closed. This rim can be located on the inside or outside of the churn and is adapted to be turned so as to cause the perforations or valves therein to register with similar openings in the churn body for the escape of butter milk. The butter milk when allowed to escape through the perforations $h$ as will be hereinafter described strikes against the deflector attached to the churn and is deflected downwardly and settles in a pan or other receptacle F. This pan is provided with a faucet which passes through frame A for drawing off the butter milk when desired.

The bevel gear wheel G being rigidly secured to the outer end of shaft H and the bevel gear wheel G' being rigidly secured to the sleeve, it will be seen that by revolving the handle a rotary motion will be imparted to the churn B and dashers $f$, the former revolving to the right, while the latter revolves to the left.

When the operation of churning has been completed, the upper section of shaft H is disengaged from its lower section, after which the cover $b$ and its connected parts are swung backward, the cover $d^2$ of the churn B removed, and the section of shaft H carrying the dashers removed. A wire frame I to which is attached or which carries a muslin bag or cloth L is placed within the churn B. The cover $d^2$ carrying the bevel gear G' is then replaced and the churn B revolved rapidly, which causes the butter milk to flow by centrifugal action toward the top of the churn and out through the perforations or valves $h$. The rotating of the churn causes the butter to form in a roll within the muslin bag or cloth and when thus formed the top of churn B is again removed and the butter taken out.

It is evident that changes in the construction and relative arrangement of the several parts might be made without affecting my invention and hence I would have it understood that I do not restrict myself to the particular construction and arrangement of parts shown and described, but, Having fully described my invention, what I claim as new, and desire to secure by Letters Patent, is—

1. The combination with a churn body having openings in its sides, of a valve or ring for closing said openings the said valve or ring having openings adapted to register with the openings in the churn body, a pan or receptacle below the churn body, and a deflector above the openings in said body, the said deflector adapted to direct the material into the pan, substantially as set forth.

2. The combination with a churn body having openings in its sides, and a ring embracing said body and having openings adapted to register with the openings in the body, of a lid or cover having an upwardly projecting sleeve, a bevel wheel on said sleeve and a shaft and bevel wheel thereon, the latter engaging the wheel on the sleeve, substantially as set forth.

3. The combination with a rotary churn body having openings therein, and a shaft, of a frame having a fabric surrounding the sides and upper end thereof, substantially as set forth.

4. The combination with a container, a rotary churn therein having openings in its sides, and means for closing said openings, a pan, a faucet connected with said pan and a deflector located above the openings in the churn body, of a shaft and gearing for rotating the churn body, substantially as set forth.

In testimony whereof I have signed this specification in the presence of two subscribing witnesses.

WILLIAM P. BENDING.

Witnesses:
D. K. WUNDERLICH,
H. G. WOLF.